(12) United States Patent
Miettinen

(10) Patent No.: US 9,259,896 B2
(45) Date of Patent: Feb. 16, 2016

(54) DOCTOR BLADE MATERIAL

(75) Inventor: Pentti Miettinen, Heinävaara (FI)

(73) Assignee: EXEL COMPOSITES OYJ, Vantaa (FI)

( * ) Notice: Subject to any disclaimer, the term of this patent is extended or adjusted under 35 U.S.C. 154(b) by 153 days.

(21) Appl. No.: 14/118,459

(22) PCT Filed: Jun. 27, 2012

(86) PCT No.: PCT/FI2012/050665
§ 371 (c)(1),
(2), (4) Date: Dec. 27, 2013

(87) PCT Pub. No.: WO2013/001164
PCT Pub. Date: Jan. 3, 2013

(65) Prior Publication Data
US 2014/0106113 A1    Apr. 17, 2014

(30) Foreign Application Priority Data

Jun. 28, 2011  (FI) ...................................... 20115674

(51) Int. Cl.
*B32B 5/12*    (2006.01)
*B32B 5/26*    (2006.01)
*D21G 3/00*    (2006.01)

(52) U.S. Cl.
CPC ... *B32B 5/12* (2013.01); *B32B 5/26* (2013.01); *D21G 3/005* (2013.01); *B32B 2250/20* (2013.01); *B32B 2250/40* (2013.01); *B32B 2260/046* (2013.01); *B32B 2262/101* (2013.01); *B32B 2262/106* (2013.01); *Y10T 428/24124* (2015.01)

(58) Field of Classification Search
CPC ..................... Y10T 428/24124; F41H 5/0485; B32B 5/12
USPC .................. 428/113, 293.4; 162/281
See application file for complete search history.

(56) References Cited

FOREIGN PATENT DOCUMENTS

WO     WO 02/092340 A1    11/2002
WO     WO 2010/146227 A1  12/2010

OTHER PUBLICATIONS

Finnish Official Action issued Feb. 28, 2012 in Finnish Patent Application 20115674.
International Search Report, issued in PCT/FI2012/050665, dated Nov. 6, 2012.
Written Opinion of the International Searching Authority, issued in PCT/FI2012/050665, dated Nov. 6, 2012.

*Primary Examiner* — Brent O'Hern
(74) *Attorney, Agent, or Firm* — Birch, Stewart, Kolasch & Birch, LLP

(57) ABSTRACT

Doctor blade material, which is composed of a number of layers that are connected to each other and include at least a frame layer. The frame layer, includes outer layers on both sides and is constructed of carbon fiber and/or mineral fiber, e.g. glass fiber, basalt fiber, et cetera. The outer layers include carbon fiber. The outer layer is a compact-multiaxial layer composed of a surface layer containing carbon fiber and of two or more support layers. The surface layer includes carbon fibers that are at a 90° angle with respect to the longitudinal direction of the doctor blade, wherein the fibers in the first support layer following the surface layer are at an angle between (−70°)-(−20°) or (+20°)-(+70°) with respect to the fibers of the surface layer. The fibers in the second support layer following this are at an angle between (+20°)-(+70°) or (−70°)-(−20°) with respect to the fibers of the surface layer.

8 Claims, 2 Drawing Sheets

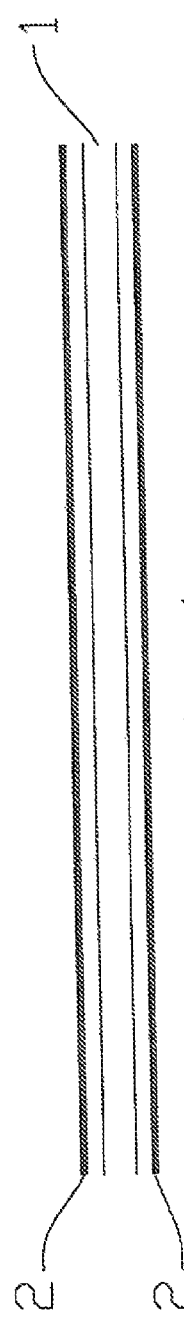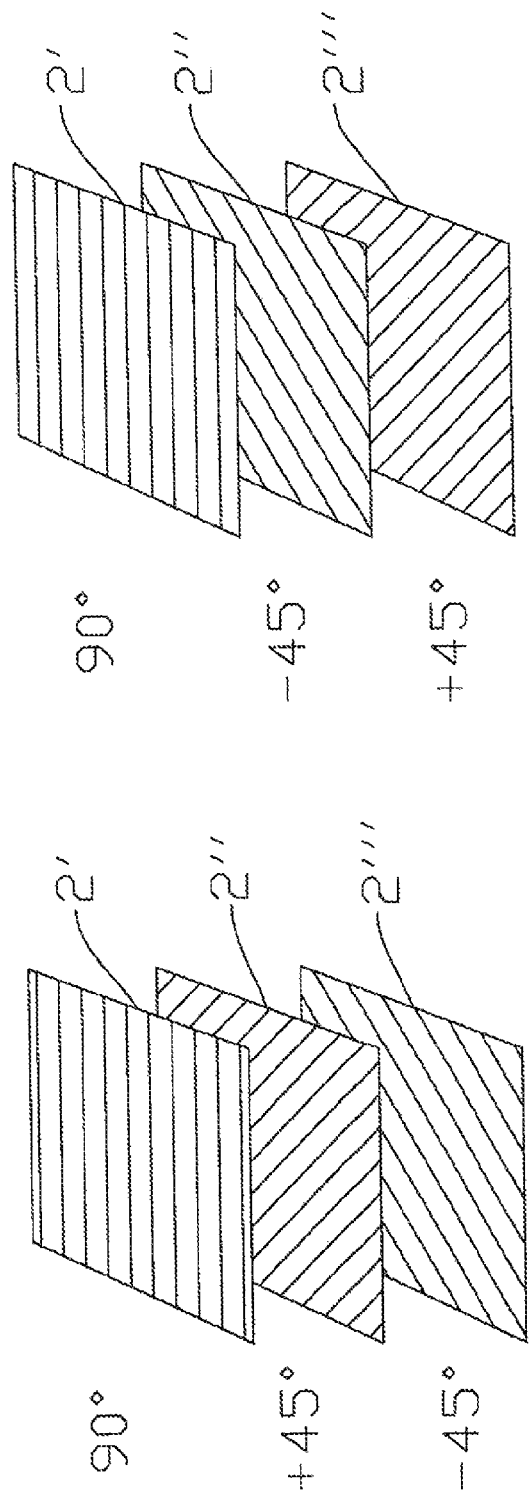

DOCTOR BLADE MATERIAL

BACKGROUND OF THE INVENTION

The present invention relates to a doctor blade material, which is composed of a number of layers that are connected to each other, which layers comprise at least a frame layer and, with respect to the frame layer, outer layers on both sides of it, which frame layer is carbon fiber and/or mineral fiber, e.g. glass fiber, basalt fiber, et cetera, and which outer layers comprise carbon fiber.

FIELD OF THE INVENTION

A doctor blade is a blade with which surplus material is scraped off the surface of a roll, and more particularly which is used in paper machines. A doctor blade is typically manufactured from metal, plastic or composite. High endurance to wear in its wearing surfaces and an otherwise robust structure are demanded of a doctor blade. Composite is a light, but strong, structure so that it is well suited to the manufacture of a doctor blade. Composite can be manufactured either with a pultrusion method or by laminating.

DESCRIPTION OF THE RELATED ART

Doctor blades manufactured from composite comprise e.g. a carbon fiber or glass fiber frame and on the surface, or in the immediate vicinity of the surface, carbon fibers, with which the wear resistance of the product is improved. Nowadays a doctor blade is typically fabricated such that the frame material is glass fiber or carbon fiber and both of its surfaces comprise carbon fiber. Carbon fiber is, however, relatively expensive, in which case the use of it in those parts of a doctor blade that are not subjected to hard mechanical stressing, more particularly to wear, incurs extra costs. In normal carbon fiber fabrics it is also necessary to use relatively thin carbon fibers to achieve a balanced structure. Thinner carbon fibers are relatively more expensive than thicker ones so that it would be advantageous to use thicker carbon fibers.

SUMMARY OF THE INVENTION

The purpose of this invention is to achieve a new type of doctor blade material, which is more inexpensive to manufacture than before and which is still sufficiently strong and durable. The doctor blade material according to the invention is characterized in that the outer layer is a compact-multiaxial layer, which is composed of at least one surface layer containing carbon fiber and of two or more support layers, in which surface layer the carbon fibers are at a 90° angle with respect to the longitudinal direction of the doctor blade, in which case the fibers in the first support layer following the surface layer of the compact-multiaxial layer are at an angle with respect to the fibers of the surface layer, which angle is between (−70°)-(−20°) or (+20°)-(+70°), and in that the fibers in the second support layer following this are at an angle with respect to the fibers of the surface layer, which angle is between (+20°)-(+70°) or (−70°)-(−20°).

One preferred embodiment of the doctor blade material according to the invention is characterized in that the fibers in the first support layer following the surface layer of the compact-multiaxial layer are at an angle of approx. −45° with respect to the fibers of the surface layer, and in that the fibers in the second support layer following this are at an angle of approx. +45° with respect to the fibers of the surface layer.

Another preferred embodiment of the doctor blade material according to the invention is characterized in that the fibers in the first support layer following the surface layer of the compact-multiaxial layer are at an angle of approx. +45°, with respect to the fibers of the surface layer, and in that the fibers in the second support layer following this are at an angle of approx. −45° with respect to the fibers of the surface layer.

Yet another preferred embodiment of the doctor blade material according to the invention is characterized in that the fibers of the support layers of the compact-multiaxial layer are carbon fiber and/or mineral fiber, such as glass fiber, basalt fiber, et cetera.

After the second support layer there can be yet another surface layer, which can be similar to the first surface layer.

The doctor blade material according to the invention is more easily adaptive (to reeling in the longitudinal direction) and more rigid in the transverse direction (the wear direction of scraping). The doctor blade material is durable in its properties, because the carbon is mainly only in the direction of wear. One advantage is that the structure enables the use of thicker carbon fibers than earlier.

BRIEF DESCRIPTION OF THE DRAWINGS

In the following, the invention will be described in more detail by the aid of some preferred embodiments with reference to the attached drawings, wherein FIG. 1 presents a side view of the strongly exaggerated basic construction of the material according to the invention.

FIG. 2 presents an explosion drawing of the structure of a compact-multiaxial layer according to the invention.

FIG. 3 presents an explosion drawing of the structure according to a second embodiment of the compact-multiaxial layer according to the invention.

DETAILED DESCRIPTION OF THE INVENTION

Figure 4:
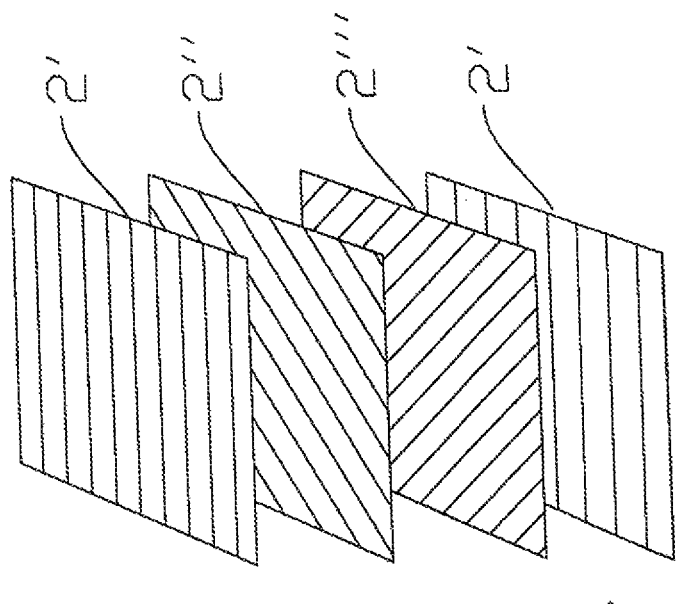
FIG. 4 presents an explosion drawing of the structure according to a third embodiment of the compact-multiaxial layer according to the invention.

In FIG. 1 the doctor blade material comprises, in principle, three layers. In the middle is a so-called frame layer 1, which is preferably a mineral-fiber layer, such as a glass-fiber layer or a basalt-fiber layer, or carbon-fiber layer. How this layer is formed, and what other substances it possibly comprises, however, is not essential from the viewpoint of the invention. On both sides of this frame layer 1, or at least on one side, is a so-called outer layer 2. When a so-called outer layer is on both sides, they are therefore disposed symmetrically in relation to the thickness of the material and in this case there are two, four, six or another even amount of them. The outer layer 2 is in this embodiment a so-called compact-multiaxial layer. The invention relates specifically to this layer. Also an auxiliary layer, which can be carbon fiber or mineral fiber or a hybrid of these, can be on the very surface. This layer is not presented in the drawings.

The thickness of the material is 1-3 mm, preferably 1.5-2.5 mm. FIGS. 2-5 present in more detail the structure of this so-called outer layer 2, i.e. of the compact-multiaxial layer.

FIG. 2 thus presents a compact-multiaxial layer (outer layer 2) according to one embodiment of the invention. It is composed of a surface layer 2', which contains carbon fibers, the direction of which is transverse (90°) with respect to the longitudinal direction of the doctor blade. The layer following the surface layer is a so-called support layer 2". After this is still a second support layer 2'''. These layers are compactly bound into a single entity with a matrix medium, which can typically be epoxy or some other structural resin. There can, of course, be more than two support layers. The support layers are preferably carbon fiber and/or mineral fiber, typically glass fiber, basalt fiber, et cetera.

The carbon fibers of the surface layer 2' of the compact-multiaxial layer are thus at a 90° angle with respect to the longitudinal direction of the doctor blade. In the embodiment of FIG. 2, the direction of the fibers of the next, i.e. the first, support layer 2" is approx. +45° with respect to the transverse carbon fibers of the surface layer 2'. Correspondingly, the direction of the fibers of the second support layer 2''' is approx. −45° with respect to the carbon fibers of the surface layer 2'.

Correspondingly, in the embodiment according to FIG. 3, the direction of the fibers of the first support layer 2" is approx. −45° with respect to the carbon fibers of the surface layer 2' and the direction of the fibers of the support layer 2''' is approx. +45° with respect to the carbon fibers of the surface layer 2'.

Most generally the fibers in the first support layer 2" following the surface layer 2' of the compact-multiaxial layer are at an angle with respect to the fibers of the surface layer, which angle is between (−70°)-(−20°) or (+20°)-(+70°), and that the fibers in the second support layer 2''' following this are at an angle with respect to the fibers of the surface layer (2'), which angle is between (+20°)-(+70°) or (−70°)-(−20°). This means that if the direction of the fibers of the first support layer 2" has a negative (−) sign with respect to the fibers of the surface layer, the direction of the fibers in the second support layer correspondingly has a positive (+) sign. Preferably the directions of the fibers of the first and of the second support layers 2", 2''' are opposite numbers to each other.

The fibers of the support layers 2", 2''' function mainly as a bearing and supporting layer for the carbon-fiber layer (surface layer 2'). The carbon-fiber layer, for its part, functions in the structure as a layer that resists wear. It is also possible that more than one of the layers (2', 2", 2''') is carbon fiber.

What is essential in the structure according to the invention is its compact-multiaxial nature and that the so-called transverse carbon-fiber layer 2' is a surface layer. The carbon fibers of the carbon-fiber layer are in the transverse direction, so that the doctor blade withstands wear. Of course, this carbon-fiber layer can comprise e.g. two superimposed carbon-fiber layers, which are at a small symmetrical angle to each other such that the average direction of the carbon is however the aforementioned 90°.

Figure 5:
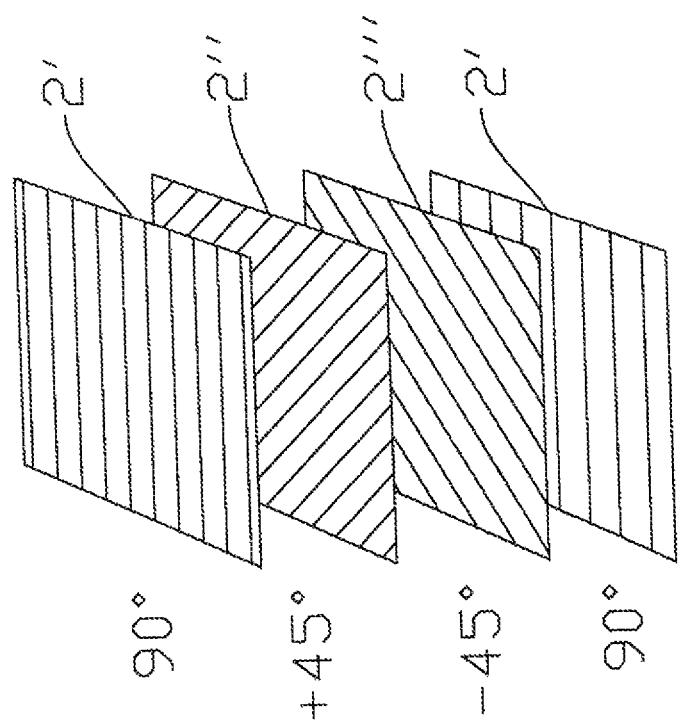
FIG. 5 presents an explosion drawing of the structure according to a fourth embodiment of the compact-multiaxial layer according to the invention.

FIG. 4 presents one embodiment, wherein the surface layers 2' of the compact-multiaxial layer surround the support layers 2", 2''' on both sides. In FIG. 4, going from the top downwards, first is a 90° surface layer 2', after it a first support layer 2", in which the fiber direction is +45° with respect to the fiber direction of the surface layer 2', then a second support layer 2''', in which the fiber direction is −45° with respect to the fiber direction of the surface layer 2', and finally a second surface layer 2', in which the direction of the fibers is 90°, as in the first surface layer 2'. In FIG. 5 the directions of the fibers of the support layers 2", 2''' are opposite to what they are in FIG. 4.

It is obvious to the person skilled in the art that the invention is not limited to the embodiments presented above, but that it can be varied within the scope of the claims presented below. The material according to the invention can be manufactured e.g. in a pultrusion machine or in a laminating machine.

The characteristic features possibly presented in the description in conjunction with other characteristic features can also, if necessary, be used separately to each other.

The invention claimed is:

1. A doctor blade material, which is composed of a plurality of layers that are connected to each other, which layers comprise at least one frame layer and outer layers disposed on both sides of the at least one frame layer, said at least one frame layer is carbon fibers and/or mineral fibers selected from the group consisting of glass fibers and basalt fibers and said outer layers comprise carbon fibers, wherein the outer layers are compact-multiaxial layers, which are composed of at least one surface layer containing carbon fibers and of two or more support layers, wherein, in the surface layer, the carbon fibers are at a 90° angle with respect to a longitudinal direction of the doctor blade; in the first support layer following the surface layer, the fibers are at an angle with respect to the fibers of the surface layer of between (−70°)-(−20°) or (+20°)-(+70°), and the fibers in the second support layer adjacent to the first support layers are at an angle with respect to the fibers of the surface layer of between (+20°)-(+70°) or (−70°)-(−20°).

2. The doctor blade material according to claim 1, wherein the fibers in the first support layer following the at least one surface layer of the compact-multiaxial layer are at an angle of about −45° with respect to the fibers of the at least one surface layer, and the fibers in the second support layer following the first support layer are at an angle of about +45° with respect to the fibers of the at least one surface layer.

3. The doctor blade material according to claim 1, wherein the fibers in the first support layer following the surface layer of the compact-multiaxial layer are at an angle of about +45° with respect to the fibers of the at least one surface layer, and the fibers in the second support layer following the first support layer are at an angle of about −45° with respect to the fibers of the at least one surface layer.

4. The doctor blade material according to claim 1, wherein the fibers in the first support layer following the surface layer of the compact-multiaxial layer are at an angle of about −45° with respect to the fibers of the at least one surface layer, and the fibers in the second support layer following the first support layer are at an angle of about +45° with respect to the fibers of the at least one surface layer, and adjacent the second support layer is a second surface layer.

5. The doctor blade material according to claim 1, wherein the fibers in the first support layer following the surface layer of the compact-multiaxial layer are at an angle of about +45° with respect to the fibers of the at least one surface layer, and the fibers in the second support layer following the first support layer are at an angle of about −45° with respect to the fibers of the at least one surface layer, and adjacent the second support layer is a second surface layer.

6. The doctor blade material according to claim 1, wherein the fibers of the support layers of the compact-multiaxial layer are carbon fibers and/or mineral fibers selected from the group consisting of glass fibers, and basalt fibers.

7. The doctor blade material according to claim 2, wherein the fibers of the two or more support layers of the compact-multiaxial layer are carbon fibers and/or mineral fibers, selected from the group consisting of glass fibers, and basalt fibers.

8. The doctor blade material according to claim 3, wherein the fibers of the two or more support layers of the compact-multiaxial layer are carbon fibers and/or mineral fibers, selected from the group consisting of glass fibers, and basalt fibers.

\* \* \* \* \*